UNITED STATES PATENT OFFICE.

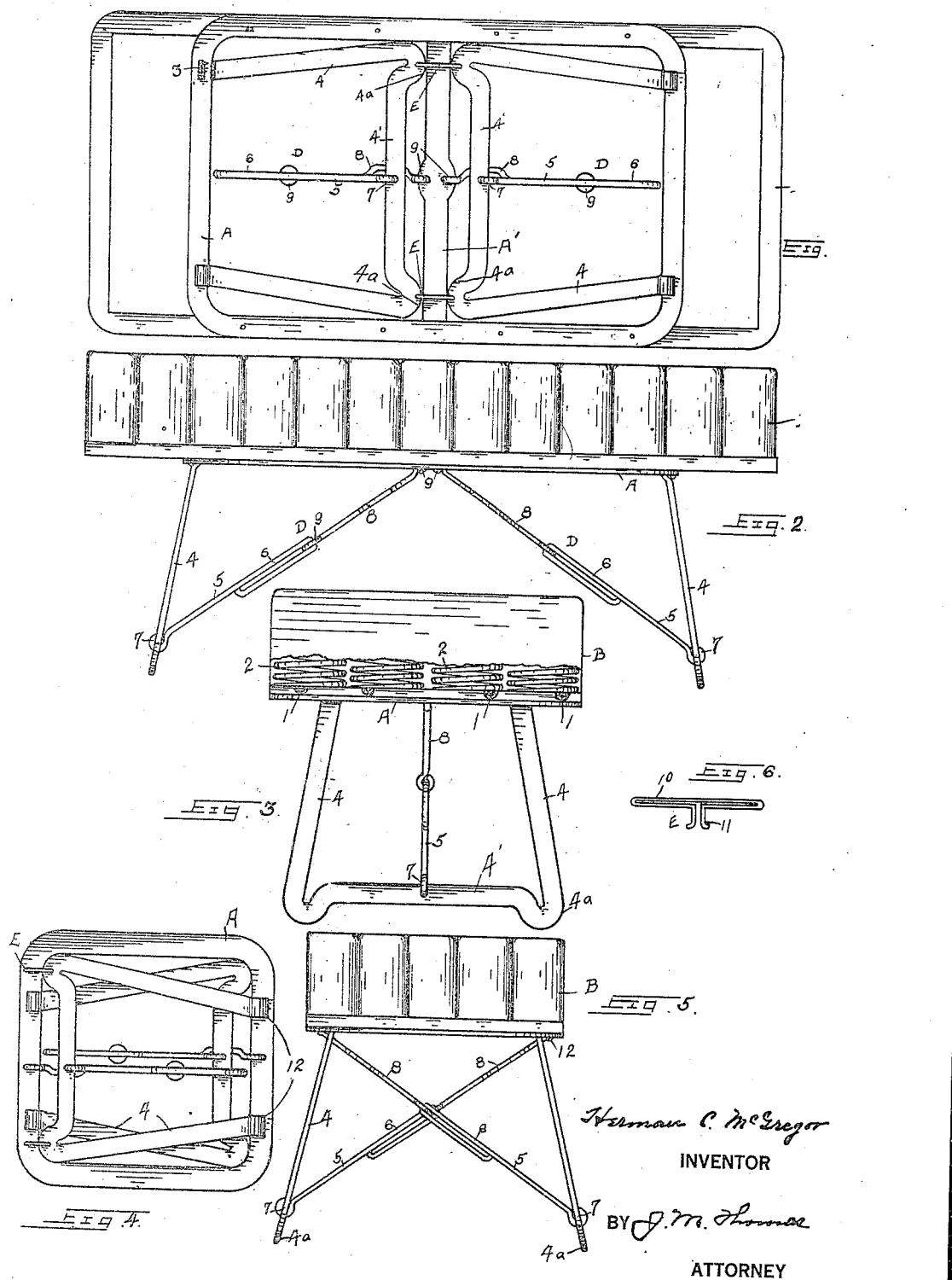

HERMAN C. McGREGOR, OF SALT LAKE CITY, UTAH.

CUSHION-SUPPORT.

1,306,306.

Specification of Letters Patent.   Patented June 10, 1919.

Application filed March 12, 1919.   Serial No. 282,222.

*To whom it may concern:*

Be it known that I, HERMAN C. McGREGOR, a citizen of the United States, residing at Salt Lake City, in the county of Salt Lake and State of Utah, have invented certain new and useful Improvements in Cushion-Supports, of which the following is a specification.

My invention relates to automobile cushions, and has for its object to provide a collapsible support for an automobile cushion whereby said cushion may be used as a raised seat for use out of the automobile.

These objects I accomplish with the device illustrated in the accompanying drawings in which similar letters and numerals of reference indicate like parts throughout the several figures and as described in the specification forming a part of this application and pointed out in the appended claims.

In the drawings in which I have shown a substantial embodiment of my invention Figure 1 is a view of the underside of an automobile cushion with my device folded in place thereon. Fig. 2 is a side elevation of an automobile cushion of length sufficient to form two or more seats with my device in place thereon and unfolded to form a support for said cushion. Fig. 3 is an end elevation of the same, parts cut away. Fig. 4 is a modified construction for use on a single seat cushion. Fig. 5 is a side elevation of the modified form. Fig. 6 is a detail of the holding clamp.

When traveling by road vehicles, such as automobiles and trucks, it is highly desirable at times to use the cushions of said vehicles as seats for the accommodation of the passengers and other persons who desire to be seated out of the vehicle, as in parks, on lawns and other places where other seats are not provided, and the present invention with slight modifications enables the change of the cushions, now in use on such vehicles, to such seats, whether such cushions have been used in single, double or more seats, by unfolding the legs and stays supplied by my invention.

I provide a frame A, conforming somewhat to the shape of the cushion B. The said frame A when used on a long cushion has a medial portion A', and said frame is secured to the underside of the said cushion B; and on cushions having reinforced bottoms the said frame is secured to the outer framework, as shown in Fig. 1. If the cushion has no special reinforcement such as its bottom, I provide transverse rods or slats 1 which are to be inserted or built into the structural parts of the cushion to support the springs 2. Elongated slots 3 are cut in said frame A, within which slots the upper end portion of the legs 4 are fastened. Each pair of said legs are made of bars, and bent into practically U-shaped forms with the horizontal reach 4' struck or bent toward the ends of the legs to form a foot portion 4ª, which portion when in contact with the ground or floor will raise the horizontal reach portion 4' above the said floor or ground, thereby insuring steady position even if the said ground or floor should be uneven. The said legs are to be so constructed as to length that when folded, the portion shown at 4' with the feet 4ª will fold between the side reaches of the said frame A and the feet 4ª will fold adjacent the medial portion A' of the frame. A linked stay D is provided for each pair of legs and consists of a rod 5 having an elongated slot 6 formed in one end and an eye loop 7 in the other end, which rod 5 coacts with another rod 8 having an eye loop 9 in each end. The said eye loops 7 are to be hooked through holes medially bored or punched in said portion 4' of the respective legs, while the eye loops 9 are to be hooked through a hole medially in the said portion A' of said frame. I provide the clamps E to hold said legs in position when the device is folded for use in the vehicle as a cushion only, each of the said clamps consisting of a straight portion 10 with an integral pivot portion 11. Preferably I construct the clamp E from a piece of wire bent upon itself to form the straight portion 10 and each end then bent at right angles thereto to form the pivot portion 11; see Fig. 6. The portion 11 is to be passed through a hole in said portion A' of the frame and struck out, and the portion 10 may then be turned and the end portion made to catch the feet of the legs when folded within the main frame A.

When using my device in its modified form for a single seat cushion, as shown in Figs. 4 and 5, the medial bar A' is dispensed with, and a short bend is given to one pair of the legs, shown at 12, in order that the folding may be complete.

Having thus described my invention I desire to secure by Letters Patent and claim:—

1. A vehicle cushion support comprising a frame having slots in the end leads; inverted U-shaped supports pivoted in the slots of said frame and having a horizontal portion above the foot portions; a stay for each of said supports consisting of a rod having a slot in one end portion and an eye loop in the other end; another rod having eye loops in each end portion with one of said eye loops engaged in the slot of the other rod; and a pivoted clamp to engage the said U-shaped supports when folded within said frame.

2. A vehicle cushion support comprising a frame having a medial cross piece, and provided with slots in the end leads, and holes in the cross piece; inverted U-shaped supports pivoted in the slots of said frame and having the horizontal lead or reach above the foot portions of said supports; a stay for each of said supports consisting of a rod having a slot in one end portion and an eye loop in the other end, and another rod having an eye loop in each end with one of the last mentioned eyes engaged in the slot of the first mentioned rod; and a pivoted clamp in said cross piece to engage the said U-shaped supports when folded within said frame.

In testimony whereof, I have affixed my signature.

HERMAN C. McGREGOR.